Patented Sept. 29, 1936

2,055,782

UNITED STATES PATENT OFFICE 2,055,782

FOOD PRODUCT AND METHOD OF PRODUCING THE SAME

Willard E. Baier, Ontario, Calif., assignor to California Fruit Growers Exchange, Los Angeles, Calif., a corporation of California No Drawing. Application January 19, 1935, Serial No. 2,588

22 Claims. (Cl. 99—206)

This invention relates to substantially dry and stable mixtures of fruit juices and milk. The invention further relates to methods used for obtaining dry mixtures of fruit juices and milk which are stable at ordinary storage temperatures.

This invention particularly relates to the stabilization of dried fruit juice-milk mixtures prepared by mixing fruit juices with fluid milk and adjusting the pH of the mixture, preferably before drying.

This invention more particularly relates to the production of stable dried citrus juice-milk mixtures by adjusting the pH of a mixture of citrus juice and milk to within a definite pH range and then drying the mixture, preferably by spray drying.

It is to be understood that when the term "milk" is used in this specification and the appended claims, it applies to all those milk products which are adaptable to the successful accomplishing of this invention, for example, skim milk, whole milk, cream, condensed or evaporated milk, etc., unless otherwise specified.

I have found that the fruit juice and/or the milk to be used may be concentrated if desired. This is a great convenience and extremely advantageous since it allows of a very appreciable saving in container and transportation costs if it is necessary to transport the juice and/or the milk.

Further, I have discovered that by adjusting the pH of fruit juice-milk mixtures, dry products may be prepared which are comparatively stable, particularly with regard to color, flavor, and odor, and with respect to the retention of their vitamin content.

It is known that by properly proportioning the fruit juice and milk content of such a mixture it is possible to prepare a material which may be satisfactorily dried without using added drying aid. I have found that dried products resulting from such mixtures have poor keeping qualities. Such products, however, have been found to possess extremely advantageous characteristics as to keeping quality, particularly in the matter of increased stability with regard to odor, flavor, color and vitamin content, if the pH of the mixture is suitably and properly adjusted, preferably before the drying operation is performed.

Furthermore, I have discovered that the pH range within which these dried fruit juice-milk products should preferably fall is between pH 3.1 to 3.9. This value, as expressed here and in the appended claims, is determined by means of a hydrogen electrode with a solution of the final material in distilled water, using 10% by weight of the dried fruit juice-milk solids in the solution. Dried fruit juice-milk products have a pH falling outside the range of about 3.1 to about 3.9 are relatively unstable with respect to color and more particularly with regard to odor and flavor.

It has become evident to me that upon prolonged storage, mixtures of fruit juice-milk products having a pH higher than about 3.9, tend to take on an odor and flavor suggestive of very stale dried milk. On the other hand, mixtures having a pH lower than about 3.1 acquire a very disagreeable odor suggestive of putrefying meat.

Accordingly, an object of this invention is to, disclose and provide methods and means of preparing dry fruit juice-milk mixtures, comparatively stable as to color, odor, flavor, etc.

A further object of this invention is to disclose and provide methods and means of preparing sensibly dry citrus juice-milk mixtures which are comparatively stable as to color, odor, flavor, etc.

A still further object of this invention is to disclose and provide methods and means of preparing a sensibly dry acidified orange juice-milk mixture which is comparatively stable as to color and odor, flavor, etc.

Another object of this invention is to disclose and provide methods and means of preparing dry fruit juice-milk mixtures, comparatively stable as to color, odor, and flavor, etc., and which are readily dispersible in aqueous media to form pleasing beverages.

A further object of this invention is to disclose and provide methods and means of preparing a suitably dry citrus juice-milk mixture with improved stability of color and odor, and in which the citrus juice solids and milk solids are homogeneously blended to the extent that when dissolved in water the curds remain as a very fine suspension.

A still further object of this invention is to disclose and provide methods and means of preparing sensibly dry fruit juice-milk mixtures which are comparatively stable as to color and odor and which may be combined with sugar as desired, and which are readily soluble in water, milk, or other liquids, to form a most desirable beverage.

Another object of this invention is to disclose and provide methods and means of preparing sensibly dry fruit juice-milk mixtures which are comparatively stable with respect to the retention of their vitamin content.

Other objects and advantages of this invention will be apparent from a description of a preferred process and product embodied in the invention and will present themselves to those skilled in the art and in the contemplation and use of this invention.

I have found that there are various modifications as to the method that may be employed in the preparation of my new product. In order to make this invention readily understandable to those skilled in the art, the following detailed descriptions of my methods of procedures are given. I prefer to use the juice of citrus fruits, as described in the following example, although other fruit juices, for example, pineapple or tomato, may be employed.

The percentage of citrus juice solids relative to the total solids of the citrus juice-milk mixture is maintained approximately within the limits of 20% to 70%. Where the citrus juice solids fall below 20% the citrus juice characteristics, particularly with regard to flavor, are not pronounced. I have found that where the citrus juice solids are above about 70%, the product offers difficulties in drying and keeping in powder form. Therefore, it is very desirable to have about 30% or more of milk solids present in the mixture, where it is intended that the milk is to act as the drying aid.

To obtain the best results, I find it is desirable to determine the pH of a small portion of the materials, which small portion has been made up of the desired proportion of citrus juice and milk. Based on this determination I proceed to make such pH adjustments on the body of the material as may be necessary by the addition of buffer material or materials, or acid or acidic materials, as required.

It follows that where a pH lower than 3.1 is present, I raise the pH to the desired point by the addition of a buffer salt such as sodium citrate; or by the addition of an alkaline material such as sodium hydroxide, soda ash, sodium carbonate, or sodium bicarbonate, or other suitable alkaline compounds, or by the addition of a fruit juice, preferably citrus, of a higher pH; or by a combination of any of these methods.

Where a pH higher than 3.9 is shown, I lower the pH by the addition of a fruit acid, such as citric, tartaric acid, or any suitable acid, such as hydrochloric acid, or by adding a fruit juice, preferably citrus, of a lower pH; or by a combination of these methods.

It is sometimes desirable to increase the characteristic flavor of the citrus juice used. This may be accomplished by the addition of a citrus oil corresponding in kind to the citrus juice being used. I have found that in many instances the characteristic citrus flavor is agreeably enhanced by the addition of the corresponding citrus oil in proportions of about 1 to 3% by weight of the citrus juice solids present.

Where mixtures of lemon juice and milk are employed for preparing the product, it is ordinarily necessary to increase the pH in order to bring it within the preferred range. Lemon juice, having considerable quantities of citric acid, may have a pH as low as 2.2, and upon mixture in approximately equal quantities with milk, will give mixtures having pH values below the preferred range for a suitable product. I have found that with lemon juice of average composition, the pH may be satisfactorily modified so that the final mixture is brought within the desired range by the addition of sufficient alkaline material to neutralize about 1.7% to about 17% of the titrable citric acid present in the lemon juice. Or the pH may be suitably adjusted by the addition of buffer materials, salts, etc., of which sodium citrate is a good example. Numerous other suitable materials may be employed.

After the pH adjusting material has been mixed with the citrus juice, it is added to the milk and the whole is thoroughly mixed by a suitable means and the material is then dried. For the drying, I prefer to use a spray drier, since by this method I obtain a fine, sensibly dry product which will maintain its valuable characteristics over a period of at least several months if stored at room temperatures. When desired, it may be dissolved in water or milk, and sugar added if necessary to provide a pleasing and wholesome beverage. The dry product may also be mixed with sugar in any desired proportions and stored for use.

It will be readily apparent to those skilled in the art that various changes and modifications may be made in the exact procedures, as hereinabove outlined, without departing from the spirit of my invention.

For example, by mixing lemon juice with milk that has been zeolite treated, and which has thus undergone a base exchange between the calcium and sodium ions, the mixture may be made to fall within the preferred pH range with the addition of very little or no basic materials, such as sodium citrate, etc.

By zeolite treated milk, as used above, I refer to milk that has been processed through zeolite filters, somewhat after the manner in which water is softened by that process.

In the production of a specific lemon juice-milk powder I may proceed substantially as follows:

*Example I*

| | Parts |
|---|---|
| Lemon juice (approximately 7.8% solids and containing 5.6% anhydrous citric acid) | 323 |
| Skim milk, approximately 9.0% solids | 403 |
| Soda ash | 2.6 |

The pH of the above mixture should fall within the range of about 3.1 to about 3.9.

The material used for reducing the acidity is preferably added to the lemon juice and then the lemon juice and skim milk are thoroughly mixed together and the resulting mixture is dried, preferably by spray drying.

Instead of actually neutralizing part of the acidity, various buffer salts, such as sodium citrate, may be employed.

A specific example of an orange juice-milk powder follows:

*Example II*

| | Parts |
|---|---|
| Orange juice solids | 423 |
| Skim milk solids | 423 |
| Concentrated HCl C. P. (specific gravity 1.19) | 32.4 |

The orange juice and the skim milk are used in amounts sufficient to contain the solids specified.

The acid is added to the orange juice, preferably before adding this to the skim milk. After the acidified orange juice has been thoroughly mixed with the skim milk, the mixture is dried, preferably by a spray drier. A 10% dispersion of this powder in distilled water will have a pH of approximately 3.4.

Citric acid, or various other edible acids, may be employed instead of hydrochloric. In the final product, when HCl is used, most of the chloride ion is present as common salt, and other chloride salts, the weaker acids, such as citric, being freed from the naturally occurring salts, and existing in the final product in the free state.

A specific orange and lemon juice-milk mixture may be made as follows:

*Example III*

| | Parts |
|---|---|
| Orange juice, sufficient to contain soluble solids | 103 |
| Lemon juice, sufficient to contain soluble solids | 81 |
| Skim milk, sufficient to contain soluble solids | 184 |

The lemon juice and orange juice are preferably mixed and then added to the skim milk, which mixture is dried, preferably in a spray drier.

A 10% dispersion of the final product in water will have a pH of about 3.3. The proportions of orange juice and lemon juice may be varied within the pH range indicated. Or they may be varied more widely, the pH being controlled within the desired range by means of added buffer, including the addition of free alkalies, carbonates, etc., or by means of added acidic material.

Therefore, I do not limit myself to the exact product or procedure as described but only as indicated in the appended claims.

Having thus fully described my invention in such clear, concise, and exact terms as to enable others skilled in the art to make, use, and compound my new product, I claim as my invention and desire to obtain Letters Patent on the following:

1. A new food product comprising a dried fruit juice-milk mixture having a pH of about 3.1 to about 3.9.

2. A new food product comprising a dried citrus fruit juice-milk mixture having a pH of about 3.1 to about 3.9.

3. A new food product comprising a dried orange juice-milk mixture having a pH of about 3.1 to about 3.9.

4. A new food product comprising a dried lemon juice-milk mixture having a pH of about 3.1 to about 3.9.

5. A new food product comprising a dried mixture of orange juice, lemon juice and milk, the mixture having a pH of about 3.1 to about 3.9.

6. A new food product comprising a dried mixture of orange juice and milk containing the dried residue from a material more acidic than orange juice, the mixture having a pH of about 3.1 to about 3.9.

7. A new food product comprising a dried mixture of orange juice and milk containing the dried residue from added hydrochloric acid, the mixture having a pH of about 3.1 to about 3.9.

8. A dried mixture of orange juice, citric acid, and milk, the mixture having a pH of about 3.1 to about 3.9.

9. The process comprising mixing fruit juice and milk under such conditions of acidity that upon drying a product is obtained having a pH of about 3.1 to about 3.9, and drying the mixture.

10. In the preparation of dried fruit juice-milk mixtures, the step of regulating the acidity so that the pH of the dried mixture will lie within a range of about 3.1 to about 3.9.

11. The process comprising drying a mixture of citrus juice and milk under such conditions of acidity that a product is obtained having a pH of about 3.1 to about 3.9.

12. The process comprising mixing orange juice and milk under such conditions of acidity that upon drying a product is obtained having a pH of about 3.1 to about 3.9, and drying the mixture.

13. The process comprising mixing lemon juice and milk under such conditions of acidity that upon drying a product is obtained having a pH of about 3.1 to about 3.9, and drying the mixture.

14. The process comprising mixing orange juice, lemon juice and milk under such conditions of acidity that upon drying a product is obtained having a pH of about 3.1 to about 3.9, and drying the mixture.

15. The process comprising mixing orange juice, a material more acidic than orange juice, and milk, and drying the mixture, whereby a product is obtained having a pH of about 3.1 to about 3.9.

16. The process comprising mixing orange juice, lemon juice, and milk, and drying the mixture, whereby a product is obtained having a pH of about 3.1 to about 3.9.

17. The process comprising mixing orange juice, hydrochloric acid, and milk, and drying the mixture, whereby a product is obtained having a pH of about 3.1 to about 3.9.

18. The process comprising mixing orange juice, citric acid, and milk, and drying the mixture, whereby a product is obtained having a pH of about 3.1 to about 3.9.

19. The process comprising mixing lemon juice, a material adapted to reduce the active acidity of the lemon juice, and milk, and drying the mixture, whereby a product is obtained having a pH of about 3.1 to about 3.9.

20. The process comprising mixing lemon juice, sodium citrate, and milk, and drying the mixture, whereby a product is obtained having a pH of about 3.1 to about 3.9.

21. A new food product comprising a dried mixture of lemon juice and milk containing the dried residue from a material less acidic than lemon juice, the mixture having a pH of about 3.1 to about 3.9.

22. A dried mixture of lemon juice, sodium citrate, and milk, the mixture having a pH of about 3.1 to about 3.9.

WILLARD E. BAIER.